United States Patent
McCarten

(10) Patent No.: US 8,825,582 B2
(45) Date of Patent: Sep. 2, 2014

(54) RULE-BASED VIRTUALIZATION

(71) Applicant: Symantec Corporation, Mountain View, CA (US)

(72) Inventor: Ryan M. McCarten, Redwood City, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 13/925,338

(22) Filed: Jun. 24, 2013

(65) Prior Publication Data

US 2013/0290240 A1 Oct. 31, 2013

Related U.S. Application Data

(63) Continuation of application No. 12/549,689, filed on Aug. 28, 2009, now Pat. No. 8,473,444.

(51) Int. Cl.
*G06N 5/02* (2006.01)
*H04L 29/06* (2006.01)

(52) U.S. Cl.
CPC ............ *G06N 5/025* (2013.01); *H04L 63/0263* (2013.01)
USPC .............................. 706/47; 726/11

(58) Field of Classification Search
CPC ............................ G06N 5/025; H04L 63/0263
USPC ................................ 706/47; 726/11
See application file for complete search history.

(56) References Cited

U.S. PATENT DOCUMENTS

| 5,487,167 A | 1/1996 | Dinallo et al. |
| 5,581,764 A | 12/1996 | Fitzgerald et al. |
| 5,708,796 A | 1/1998 | Ozden et al. |
| 5,712,976 A | 1/1998 | Falcon, Jr. et al. |

(Continued)

FOREIGN PATENT DOCUMENTS

| WO | W097/00475 | 1/1997 |
| WO | W097/46955 | 12/1997 |
| WO | W098/11723 | 3/1998 |

OTHER PUBLICATIONS

Yang Yu, et al: "A Feather-weight Virtual Machine for Windows Applications"; Jun. 14, 2006; pp. 24-34.

(Continued)

*Primary Examiner* — Jeffrey A Gaffin
*Assistant Examiner* — Ola Olude Afolabi
(74) *Attorney, Agent, or Firm* — Rory D. Rankin; Meyertons, Hood, Kivlin, Kowert & Goetzel, P.C.

(57) ABSTRACT

A system and method for controlling interaction among environments including virtualized environments and a system environment. A process issues a request to perform an action on a resource or a second process. A virtualization environment manager operating in the system environment detects the request and in response, retrieves data associated with the request identifying the first process, a base environment corresponding to the process, and the resource, and retrieves a first rule from a programmable database of rules. A base environment of a process is an environment in which a process is running. The first rule corresponds to at least one of the first process, the base environment, and the resource and identifies a target environment in which to process the request. The target environment is different from the base environment of the process. The virtualization environment manager directs the request to the target environment.

18 Claims, 9 Drawing Sheets

(56) References Cited

U.S. PATENT DOCUMENTS

| | | | |
|---|---|---|---|
| 5,742,768 | A | 4/1998 | Gennaro et al. |
| 5,745,380 | A | 4/1998 | Sandvoss et al. |
| 5,754,774 | A | 5/1998 | Bittinger et al. |
| 5,761,477 | A | 6/1998 | Wahbe et al. |
| 5,764,235 | A | 6/1998 | Hunt et al. |
| 5,765,164 | A | 6/1998 | Prasad et al. |
| 5,787,284 | A | 7/1998 | Blainey et al. |
| 5,802,292 | A | 9/1998 | Mogul |
| 5,835,749 | A | 11/1998 | Cobb |
| 5,878,223 | A | 3/1999 | Becker et al. |
| 5,919,247 | A | 7/1999 | Van Hoff et al. |
| 5,933,644 | A | 8/1999 | Wallace |
| 5,974,129 | A | 10/1999 | Bodnar |
| 5,978,788 | A | 11/1999 | Castelli et al. |
| 5,978,791 | A | 11/1999 | Farber et al. |
| 6,003,087 | A | 12/1999 | Housel, III et al. |
| 6,009,410 | A | 12/1999 | LeMole et al. |
| 6,073,129 | A | 6/2000 | Levine et al. |
| 6,088,524 | A | 7/2000 | Levy et al. |
| 6,122,628 | A | 9/2000 | Castelli et al. |
| 6,311,221 | B1 | 10/2001 | Raz et al. |
| 7,735,057 | B2 | 6/2010 | Rachman et al. |
| 8,473,444 | B1 | 6/2013 | McCarten |
| 2004/0230971 | A1 | 11/2004 | Rachman et al. |
| 2008/0010630 | A1 | 1/2008 | Ou-Yang et al. |
| 2008/0022385 | A1* | 1/2008 | Crowell et al. .............. 726/11 |

OTHER PUBLICATIONS

Japanese Patent Application Laid-open No. Hei 10-133976.
Japanese Patent Application Laid-open No. Sho 64-36332.
Japanese Patent Application Laid-open No. Hei 10-162057.
G. Glass, "A Universal Streaming Service", C++ Report, Apr. 1996, pp. 74-76 and 81-83.
T. Ritchey, "Java!", New Riders Publishing, Dec. 1995, pp. 214-216.
Chen, Z. et al., (Dec. 11-14, 1995) "Real time video and audio in the world wide web" World Wide Web Journal, Fourth International World Wide Web Conference, pp. 333-348.
Jiang, Z. And Kleinrock, L. (1997) "Prefetching links on the WWW" IEEE International Conference on Communications (ICC), US, New York, NY: IEEE, pp. 483-489.
M. Schwartz, "Telecommunication Networks: Protocols, Modeling and Analysis", Jan. 1, 1987; Addison-Wesley Publishing Company, pp. 266-283.
J. Basu et al., "Degrees of Transaction Isolation in SQL *Cache: A Predicate-based Client-side Caching System", May 15, 1996, pp. 1-22.
Amit Shukla et al., "Storage Estimation for Multidimensional Aggregates in the Presence of Hierarchies", VLDB Conference Mumbai (Bombay), 1996, pp. 522-531.
Dale Skeen, "New Forms of Persistent Queries Are Necessary to Handle Live Business Data As It Speeds Through a Company", internet website www.byte.com BYTE Magazine, Feb. 1998, 5pgs.
V. Hoff et al., "The Open Software Description Format (OSD)", internet website www.w3.org, Aug 11, 1997, pp. 1-13.
Red Brick Vista, "Aggregate Computation and Management", internet website www. informix.com, printed Oct. 4, 2000.
Fireclick, "Web Site Performance is Key to E-Commerce Sucess", internet website WWW. Fireclick.com printed, Nov. 1, 2000.
Boost Web Optimizer Technology Overview, "How it Works", Sep. 27, 2000 and internet website www.boostworks.com printed Nov. 1, 2000.
"Delivering Windows to the Net White Paper", WinToNet by Menta Software, 2000 and Website http:/1216.205.21.102/ printed Nov. 1, 2000.
"First There was Streaming Audio, then Streaming Video. Now get ready for Streaming Software", Stream Theory White paper and Website WWW.Streamtheory.com printed Sep. 22, 2000.
"OSD Describing Software Package on the Internet", Marimba Inc. White paper 1998 and website www.marimba. com, printed Nov. 1, 2000.
"Timbale for Windows Terminal Services" Marimba Promotional document, undated, 2000.
Japanese Patent Application Laid-open No. Hei 8-51596.
Japanese Patent Application Laid-open No. Hei 10-91446.
Japanese Patent Application Laid-open No. Hei 7-271603.
Japanese Patent Application Laid-open No. Hei 8-6878.

* cited by examiner

RULE-BASED VIRTUALIZATION

This application is a continuation of U.S. patent application Ser. No. 12/549,689, entitled "RULE-BASED VIRTUALIZATION", filed Aug. 28, 2009.

BACKGROUND OF THE INVENTION

1. Field of the Invention

This invention relates to virtualization in a computer system. More particularly, the invention relates to a system and method for controlling interaction between virtualized environments and other environments in computer systems.

2. Description of the Related Art

Virtualization may be used in computer systems to fully or partially decouple software, such as an operating system (OS), from a system's hardware and provide an end-user with an illusion of multiple OSes running on a same machine each having its own resources. An end user may be presented with one or more virtualized environments in which applications may be operated in addition to the environment provided by the operating system (the system environment). A virtualized environment may be thought of as a "sandbox" where applications can be placed that will contain and constrain an application's behavior. Generally speaking, from an application's point of view, there may be no detectable differences between a physical operating system environment and a virtualized environment. However, an application running in a virtualized environment may be isolated from other applications running in other virtualized environments, or from the physical operating system environment. In addition, an application running in a virtualized environment may be prevented from affecting the configuration of the physical operating system environment.

Complete isolation of applications, processes, and/or resources in virtualized environments as described above is not always desirable. For example, documents created in a virtualized environment by a virtualized application may be lost when a virtualized application is destroyed. Also, it may be desirable for a process in one environment to have access to a process or data that is in another environment. Accordingly, systems and methods of controlling interaction between virtualized environments and other environments are desired.

SUMMARY OF THE INVENTION

Various embodiments of a system and method for controlling interaction among environments in a host computer system including virtualized environments are contemplated. According to some embodiments, the system may include a non-virtual system environment and one or more virtualized environments. A first process running in an environment issues a request to perform an action on a resource or a second process. A virtualization environment manager operating in the system environment detects the request and in response, retrieves data associated with the request identifying the first process, a base environment corresponding to the process, and the resource and retrieves a first rule from a programmable database of rules. A base environment of a process is an environment in which a process is running. The first rule corresponds to at least one of the first process, the base environment, and the resource and identifies a target environment in which to process the request. The target environment is different from the base environment of the process. The virtualization environment manager directs the request to the target environment.

In a further embodiment, the system includes a rules engine. The rules engine converts a first database of rules to a second database of rules from which the first rule is retrieved. The second database includes a first rules table in which rules correspond to processes and a second rules table in which rules correspond to resources. In a still further embodiment, the first rule corresponds to both a rule from the first database that applies to a particular environment and a rule from the first database that applies to a particular virtualized resource.

In yet another embodiment, the action includes one or more of communicating with the second process, writing a value to a registry, reading a value from a registry, writing a file to a file system, reading a file from a file system, accessing a physical resource, and accessing a named object. In a still further embodiment, the target environment is a non-virtualized environment and the resource is accessible as a non-virtualized resource in the target environment.

In a still further embodiment, the first rule also identifies an alternative target environment in which to process the request. The virtualization environment manager directs the request to the alternative target environment in response to determining that the resource is not accessible in the target environment. In one embodiment, the first database of rules and an application that corresponds to the first process are received by the host computer system in an install package and the application is installed in the base environment.

Also contemplated is a method of controlling interaction among environments in a host computer system including a non-virtualized system environment and one or more virtualized environments. The method includes a first process running in an environment issuing a request to perform an action on a resource or a second process. The method further includes a virtualization environment manager operating in a system environment detecting the request and in response, retrieving data associated with the request identifying the first process, a base environment corresponding to the process and the resource, retrieving a first rule from a programmable database of rules. A base environment of a process is an environment in which a process is running. The first rule corresponds to at least one of the first process, the base environment, and the resource and identifies a target environment in which to process the request. The target environment is different from the base environment of the process. The method further includes directing the request to the target environment.

In a still further embodiment, a computer-accessible storage medium stores program instructions executable by a computer system to issue a request from a first process running in one of multiple environments including a non-virtualized system environment and one or more virtualized environments to perform an action on a resource or a second process. The program instructions are further executable to cause a virtualization environment manager operating in a system environment to detect the request and in response, retrieve data associated with the request identifying the first process, a base environment corresponding to the process, and the resource and retrieve a first rule from a programmable database of rules. A base environment of a process is an environment in which a process is running. The first rule corresponds to at least one of the first process, the base environment, and the resource and identifies a target environment in which to process the request. The target environment is different from the base environment of the process. The program instructions are further executable to direct the request to the target environment.

These and other embodiments will become apparent upon consideration of the following description and accompanying drawings.

Figure 1:
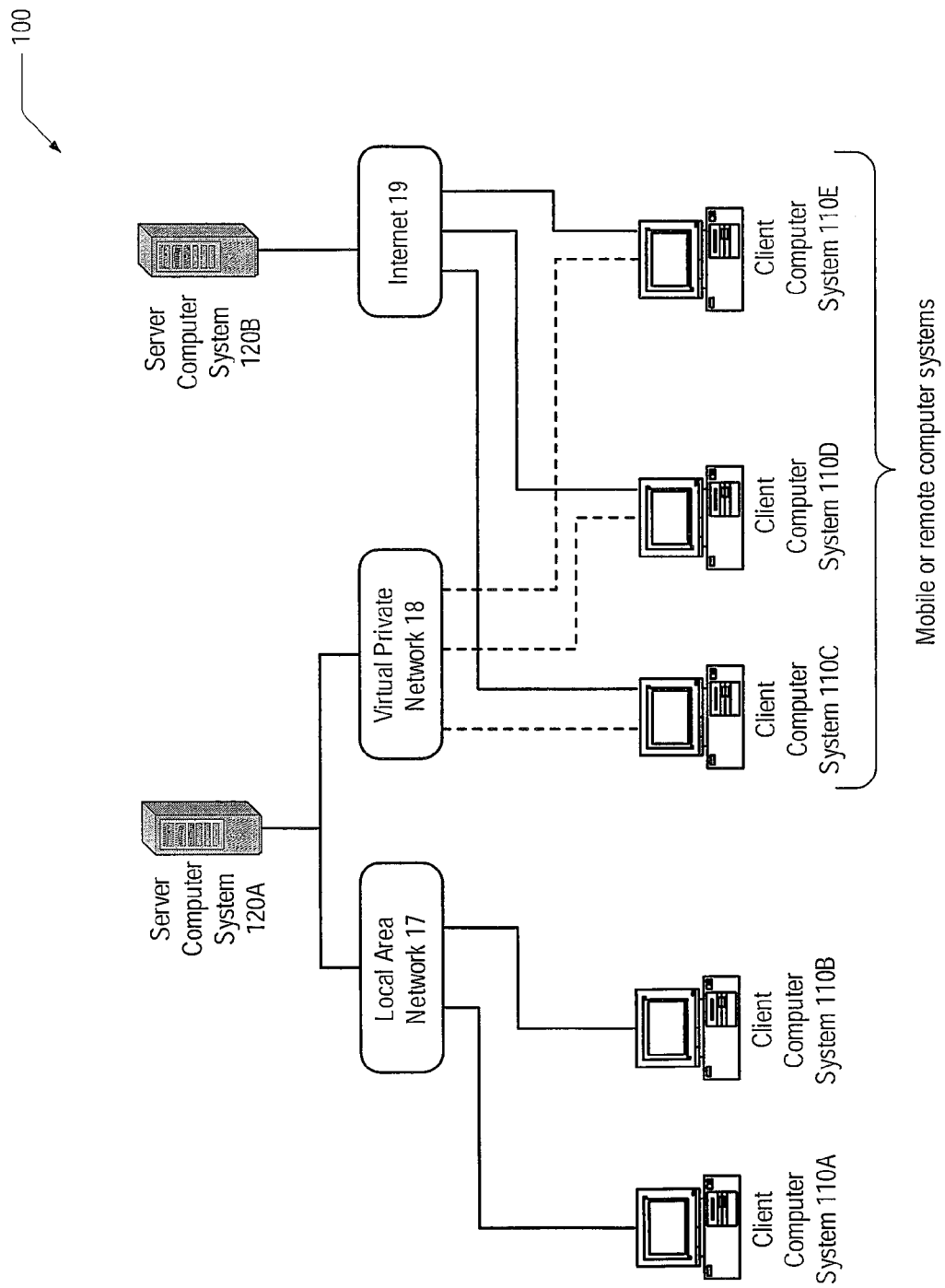
FIG. 1 illustrates one embodiment of a computer system in which rule-based control of interaction between virtualized environments may be provided.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

Various embodiments of a system and method for rule-based control of interaction among virtualized environments are described herein. FIG. 1 illustrates one embodiment of such a system. In the embodiment shown, the system includes client computing systems 110A-110E and server computing systems 120A and 120B. As used herein, elements referred to by a reference numeral followed by a letter may be collectively referred to by the numeral alone. For example, client computing systems 110A-110E may be collectively referred to as client computing systems 110. Server computing system 120A is coupled to storage device(s) 125 and server computing system 120B is coupled to storage device(s) 126. Client computing systems 110 and server computing systems 120 may be interconnected through various network elements. For example, client computing systems 110A and 110B are shown coupled to server computing system 120A via a local area network 17, client computing systems 110C, 110D, and 110E are shown coupled to server computing system 120A via a virtual private network 18 and to server computing system 120B via Internet 19. In this embodiment, client computing systems 110C-110E may be mobile and/or remote computing systems. In various embodiments the system may include any number and any type of client computing systems 110 and/or server computing systems 120. Client computing systems 110 are representative of any number of stationary computers and/or mobile computing devices such as laptops, handheld computers, television set top boxes, home media centers, telephones, etc. Client computing systems 110 and server computing systems 120 may operate as peers in a peer-to-peer configuration, as clients and servers in a client/server configuration, or a combination or peer-to-peer and client/server configurations. Each client computer 110 may, for example, be used by a particular user or member of a business or other organization, a home user(s), or otherwise.

In alternative embodiments, the number and type of computing systems and network elements is not limited to those shown in FIG. 1. Almost any number and combination of server, desktop, and mobile computing systems or devices may be interconnected in system 100 via various combinations of modem banks, direct LAN connections, wireless connections, WAN links, etc. Also, at various times one or more computing systems may operate offline. In addition, during operation, individual computing system connection types may change as mobile users travel from place to place connecting, disconnecting, and reconnecting to system 100. In one embodiment, computing system 100 or a portion thereof may be implemented as part of a cloud computing environment.

During operation, each of the client computer systems 110 and/or server computer systems 120 may obtain, install, and execute one or more software applications in either a physical operating system environment ("system environment") or in a virtualized environment. For example, software applications may include e-mail, word processing, spreadsheet, and other office productivity applications, specialized applications for handling graphics, images, audio files, video files, performing numeric calculations and the like. Numerous other software applications are known and are contemplated.

Figure 2:
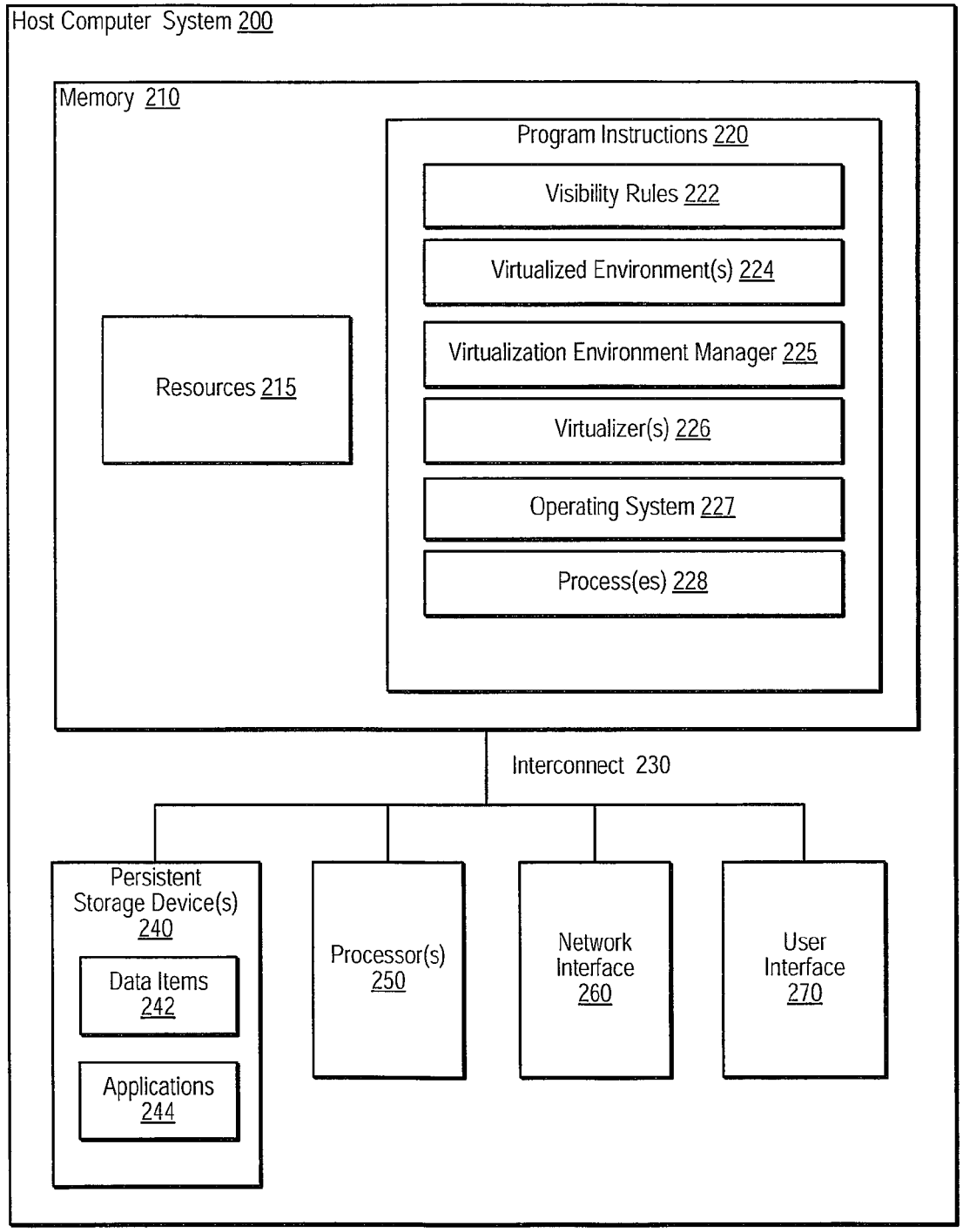
FIG. 2 illustrates one embodiment of a host computer system.

FIG. 2 illustrates one embodiment of a host computer system 200. It is noted that FIG. 2 is provided as an example for purposes of discussion, and in other embodiments the host computer system 200 may take on various other forms. Host computer system 200 may be representative of any of server computer systems 120 or client computer systems 110 described herein. Similarly, host computer system 200 may be used to implement any of the below-described methods. Host computer system 200 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device.

Host computer system 200 may include one or more processors 250, each of which may include one or more cores, any of which may be single or multi-threaded. Host computer system 200 may also include one or more persistent storage devices 240 (e.g. optical storage, magnetic storage, hard drive, tape drive, solid state memory, etc), which may include various data items 242 (e.g., files), and/or applications 244. Example applications include databases, email applications, office productivity applications, and a variety of others as known in the art. Host computer system 200 may include one or more memories 210 (e.g., one or more of cache, SRAM, DRAM, RDRAM, EDO RAM, DDR 10 RAM, SDRAM, Rambus RAM, EEPROM, etc.). Host computer system 200 may also include one or more network interfaces 260 for transmitting and receiving data, such as to or from client computer systems 110 or server computer systems 120, as described herein. Host computer system 200 may further include one or more user interfaces 270 for receiving user input or displaying output to users, such as a keyboard, mouse, or other pointing device, touch screen, and a monitor or other visual display device. Various embodiments may include fewer or additional components not illustrated in FIG. 2 (e.g., video cards, audio cards, additional network interfaces, peripheral devices, a network interface such as an ATM interface, an Ethernet interface, a Frame Relay interface, etc.).

One or more of the system memories 210 may contain program instructions 220. Program instructions 220 may be encoded in platform native binary, any interpreted language such as Java® byte-code, or in any other language such as C/C++, Java®, etc or in any combination thereof. According to the illustrated embodiment, program instructions 220 may comprise specific modules executable to implement one or more operating systems 227, such as the Windows® operating system, the Solaris® operating system, and/or the Linux® operating system. In addition, program instructions 220 may include modules to implement one or more visibility rules 222, one or more virtualized environments 224, a virtualization environment manager 225, one or more virtualizers 226, and one or more processes 228. Operation of these modules will be described in further detail below. Program code included in program instructions 220 can be combined together or separated into various modules as desired, according to a particular embodiment. One or more of the system memories 210 may also contain one or more resources 215, such a files that may be used by operating system 227, visibility rules 222, one or more virtualized environments 224, a virtualization environment manager 225, one or more virtualizers 226, and/or one or more processes 228. A process, as used herein, is an instance of a computer program such as an application. Running an application or an operating system may cause one or more processes to be executed.

Any of processes 228 may operate in one of virtualized environments 224 or in the non-virtual environment of operating system 227, also known as the system environment. In addition, resources may be accessible in the system environment or virtualized into one of virtualized environments 224. Generally speaking a resource, as used herein, refers to an object on the virtualized system such as a physical resource (processing hardware, network connection, storage device, I/O device, etc.), a registry value, file on disk, or named object such as an event, pipe, semaphore, etc. The registry, as used herein, is a database of values that are used as information settings for the physical operating system. Specifically, as shown in the embodiment of FIG. 2, resources that may be virtualized include resources 215 as well as resources stored in persistent storage device 240 including data items 242 and applications 244 as well as other resources accessible via network interface 260, user interface 270, or locating in processor 250.

During operation, a process 228 may attempt to access a resource that is located in the same environment in which the process is operating, which may be referred to as the base environment of the process, or in another environment. As discussed further below, virtualization environment manager 225 may manage such accesses via visibility rules 222 and virtualizers 226 according to one or more particular embodiments.

Figure 3:
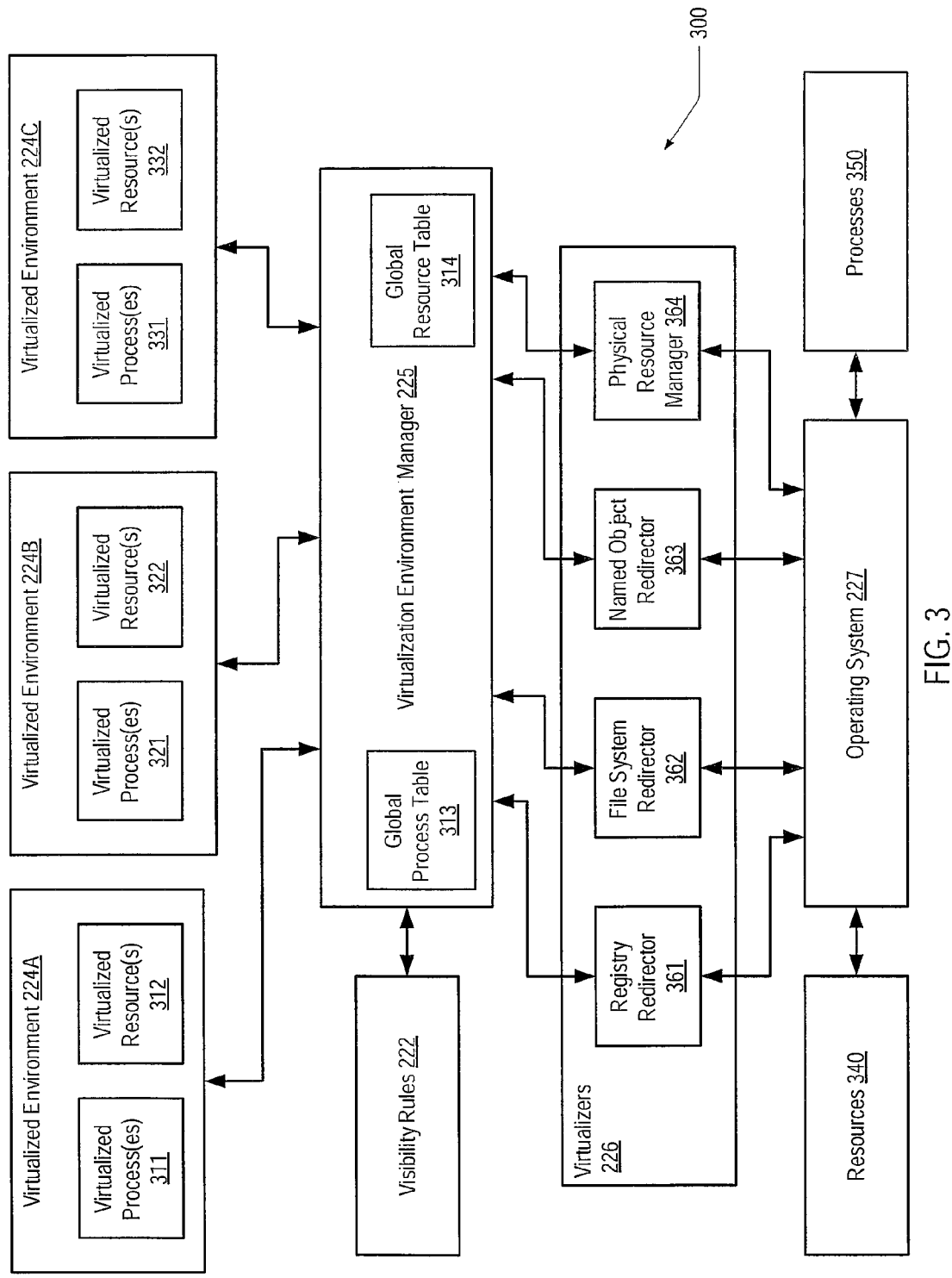
FIG. 3 is a block diagram of a system for managing access between resources and processes in different virtualized environments.

Turning now to FIG. 3, a block diagram of a system 300 for managing access between resources and processes in different virtualized environments is shown. In the illustrated embodiment, system 300 includes virtualized environments 224A-224C coupled to a virtualization environment manager (VEM) 225. VEM 225 is further coupled to visibility rules 222 and to a set of virtualizers 226. A virtualized environment, as used herein, is a group of resources and services that are provided to applications that would normally be provided by a physical operating system that are instead re-routed by an intermediate layer between the applications and the physical operating system to another location without letting the application be aware of the redirection. The intermediate layer may be used to fully or partially decouple software, such as an operating system (OS), from a system's hardware and provide an end-user with an illusion of multiple OSes running on a same machine each having its own resources. Virtualized environments 224, VEM 225, visibility rules 222, and virtualizers 226 have been described previously in connection with FIG. 2. In this embodiment, virtualizers 226 include a registry redirector 361, a file system redirector 362, a named object redirector 363, and a physical resource manager 364. Each of virtualizers 226 is shown coupled through operating system 227 to resources 340 and processes 350. Operating system 227 has been described previously in connection with FIG. 2.

In the embodiment shown, each of virtualized environments 224A-224C includes one or more virtualized processes and one or more virtualized resources. For example, virtualized environments 224A include virtualized processes 311 and virtualized resources 312. Virtualized environments 224B includes virtualized processes 321 and virtualized resources 322. Virtualized environments 224C includes virtualized processes 331 and virtualized resources 332. In the example shown, VEM 225 includes a global process table 313 and a global resource table 314. Generally speaking, the global process table 313 may be used to determine which processes exist in which environments (e.g., process X is in environment 224A, and process Y is in environment 224C) and may indicate a default lookup list of environments for each process. The global resource table 314 indicates whether an access to a resource is required to follow particular rules. For example, table 314 may be accessed on each resource request to determine if the resource/access needs to obey a different environment search than the default provided by the process accessing the resource. It is noted that while the global process table 313 and global resource table 314 are depicted as two separate tables, in other embodiments a single table or more than two tables may be utilized. Additionally, while tables 313 and 314 are shown to be included within VEM 225, in various embodiments the tables may be located elsewhere or distributed throughout the system in various ways as deemed appropriate. Further, while items 313 and 314 are referred to as "tables", any suitable format for the content of these items may be used—whether a table, list, database, or otherwise.

During operation, VEM 225 may be responsible for creating or deleting virtualized environments. VEM 225 may also be responsible for adding or removing virtualized packages including resources and processes to or from virtualized environments 224. VEM 225 may also track which virtualized environments are currently in use and which environments are active or disabled. VEM 225 may also take snapshots, clone, or combine virtualized environments. Still further, VEM 225 may be configured to manage licensing of virtualized products, deny access to a product, or even remove a virtualized product from the system at license expiration.

In one embodiment, VEM 225 may apply visibility rules 222 to determine which resources and/or processes are accessible to processes in a given environment. Once VEM 225 determines, according to a rule, that a resource may be accessed, virtualizers 226 (e.g., redirectors, etc.) may manage the storage and tracking of individual items and tracking data. Virtualizers 226 may include a specific virtualizer for each type of resource. For example, in the illustrated embodiment, registry redirector 361 is a virtualizer that may be used to access an entry in a registry for storing options and settings of hardware and software in the computing system (e.g., such as the registry found in the Windows® operating system), file system redirector 362 is a virtualizer that may be used to access files or directories in a file system, named object redirector 363 is a virtualizer that may be used to access named objects, and physical resource manager 364 is a virtualizer that may be used to access a physical resource. In other embodiments, a variety of other virtualizers may be provided, as desired.

Figure 4:
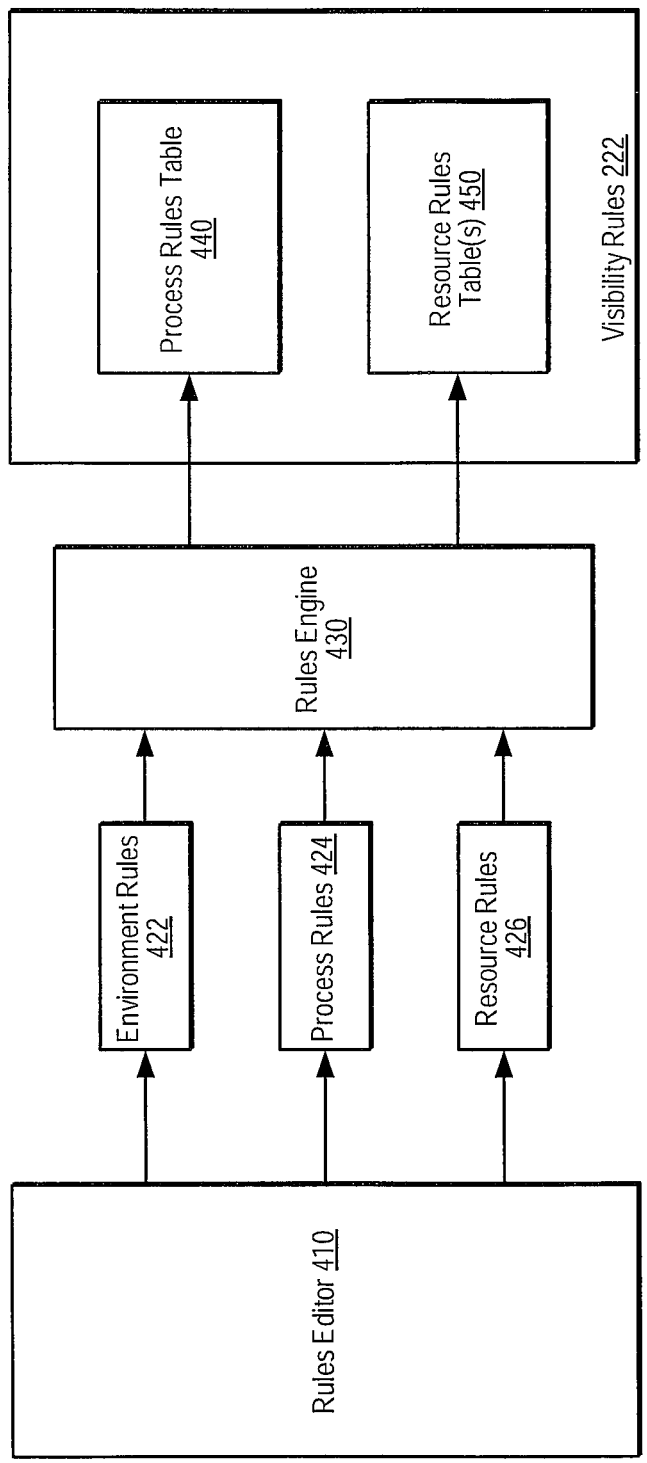
FIG. 4 is a block diagram illustrating one embodiment of components for establishing a set of visibility rules.

Turning now to FIG. 4, a block diagram illustrating one embodiment of components for establishing a set of visibility rules is shown. This embodiment includes a rules editor 410, environment rules 422, process rules 424, resource rules 426, a rules engine 430, and visibility rules 222. In this embodiment, visibility rules 222 include process rules that are collected in a process rules table 440 and resource rules that are collected in one or more resource rules tables 450. In other embodiments, a single table may be used to store both process and resource rules.

During operation, rules editor 410 may be used to define and manipulate rules that allow VEM 225 to manage virtualization of products. Rules editor 410 may track all of the rules that exist in a virtualization system. In one embodiment, rules editor may define three types of rules, environment rules 422, process rules 424, and resource rules 426. Rules engine 430 may convert environment rules 422, process rules 424, and resource rules 426 into entries in process rules table 440 and resource rules tables 450. Generally speaking, rules engine 430 may maintain the rules that enable virtualization. Individual rules may be applied globally across the system, targeted to a specific virtualized environment, or targeted to a specific application. The operation of rules engine 430 to convert rules to table entries will be described further below.

In one embodiment, each rule may include information defining an owning or "base" environment. When a virtualized environment is destroyed, rules for which it is the base environment may also be removed from the system. A rule may be owned by a virtualized environment but specify that a process in the system environment may have visibility into the virtualized environment. Accordingly, the rule may apply to the system environment (and/or other environments), but belong to the virtualized environment. Within one rule implementation, an environment may be identified by an environment ID. For example, environment ID 0 may signify the system environment (i.e., the environment from which conventionally installed products request resources by default). Environment ID "−1" may signify all environments. Virtual Environment ID "−2" may signify "my environment," which may be used in a rule that is predefined in a package before the package is installed. In alternative implementations, an environment ID may be a globally unique ID (GUID), a string, or some other suitable identifier. The special environments −1 and −2 may be interpreted as variable substitution macros, that is, any rule containing one of these explicit environment IDs may be translated into the corresponding true environment ID(s) once the rule is activated on a client machine.

Environment rules 422 are basic rules that define the virtualization of processes for virtualizers 226. In one embodiment, environment rules 422 may be assigned a lower priority than process rules 424 and resource rules 426. Environment rules 422 direct what default actions may be performed for all virtualized applications or processes running in a virtualized environment. In one embodiment, an environment rule may include the following information:

A base environment ID
An ordered list of environments from which resource requests may be satisfied.

For example, Table 1 illustrates a set of environment rules 422.

TABLE 1

Environment Rules Examples

| Base Environment ID | Environments |
|---|---|
| 1 | 1, 0 |
| 2 | 2 |
| 0 | 0, 3, 4 |

In the example of Table 1, the first rule (first row) specifies that the applications in environment 1 (environment ID "1") may satisfy requests from their own environment first (environment ID "1") and then look to the system environment (environment ID "0"). The second rule specifies that applications in environment 2 only look in their own environment; they do not have the ability to use any resource from the system or another environment. The third rule specifies that the system environment is isolated from virtualized applications in virtualized environments 1 and 2, but "sharing" is enabled for (i.e., the system has access to) applications in virtualized environments 3 and 4. Another example of an environment rule may be defined to cause any processes associated with a package to be shared with the system environment wherever the package is installed.

Process rules 424 apply to processes rather than to environments. In one embodiment, process rules 424 may have higher priority than environment rules 422. Process rules 424 are, in effect, exceptions to default environment rules processing and define which processes can see which environments. In one embodiment, a process rule may include the following information:

The process name (e.g., a process ID)
The environment that this process is part of (Table 2 below for examples)
An ordered list of environments from which resource requests may be satisfied.
An action directive For example, Table 2 below illustrates a set of process rules 424.

TABLE 2

Process Rules Examples:

| Process Name | Base Environment | Environments | Action |
|---|---|---|---|
| Word.exe | 0 | 0, 1 | Append |
| Visio.exe | −1 | 1, 0 | Append |
| Photoshop.exe | −1 | 2, 3, 0 | Append |
| Illustrator.exe | −1 | 3, 2, 0 | Append |
| Cedt.exe | −1 | 4 | Append |
| Word.exe | 5 | 5 | Append |
| Explorer.exe | −1 (same as 0) | 0, 1, 2, 3, 4 | Append |

The first rule (first row) in Table 2 indicates that Word.exe has been installed in the system environment (Base Environment "0"), for example as part of a conventional installation of Microsoft Office 2003. Accesses by Word.exe from the system environment are to be serviced in the system environment ("0") first, followed by virtualized environment "1". In contrast, the second rule specifies that Visio.exe, in any environment in which it is installed ("−1"), should direct accesses to environment ID=1 followed by the system environment "0". Note that more than one copy of Visio.exe may be installed, each in a different environment, with additional entries following the second rule in Table 2. The environment identifier in this rule type allows the rule to apply to all instance of a process that may be present in multiple virtualized environments. Specifying "−1" as a base environment causes the rule to apply to any process matching the process name in any environment. Assuming Visio.exe is installed in environment 1, Viso.exe and the version of Word.exe that is shown in Table 2 to be installed in the system environment are shared, i.e., data associated with Word.exe is visible to Visio.exe and vice-versa. Further assuming that Photoshop.exe is installed in environment 2, Illustrator.exe in environment 3, Cedt.exe in environment 4, and Word.exe in environment 5, the following information may be discerned from Table 2:

- Photoshop and Illustrator are "shared" with each other even though they are installed in different environments. One reason it may be desirable to install these two products in different environments is if they are from different versions of their manufacturer's products that require different library files (e.g., .dll files).
- Data associated with Cedt.exe is isolated from all of the other processes except Explorer.exe.
- The sixth rule in Table 2 specifies that another copy of Word.exe is installed in environment 5. This version of Word.exe is completely isolated, which prevents it from interacting with files or associated registry values in the system environment.
- Finally, the seventh rule specifies that Explorer.exe is able to locate processes in the system environment as well as environments 1-4. Specifying a base environment of −1 allows a process to be seen by Explorer.exe if the process is installed in any of these environments, while specifying that the second copy of Word.exe be installed in environment 5 avoids a conflict between the two installations of Word.exe from the viewpoint of Explorer.exe.

In one embodiment, a resource rule 426 may apply to a specific resource regardless of the process that accesses it or the environment in which it is found. Resource rules 426 may have higher priority than environment rules 422 or process rules 424. Resource rules 426 may override default virtualization actions on an individual resource basis rather than environment or process basis. A resource rule 426 may define which resources should be excluded from being virtualized—either shared or isolated. In one embodiment, a resource rule 426 may include the following information:

- The resource path (wildcards supported on a branch basis, see below).
- The resource name (or wildcard)
- Resource type (Registry vs. file system vs. named object, etc.) Alternatively, separate tables may be maintained for each different resource type.
- Base environment to which the rule applies.
- List of environments to search or place the resource. Typically, a "read into" rules may specify an environment ID list of −2, 0, which may be interpreted as: take from the process's base environment first, then the system environment. A typical "write exclude" rule may specify an environment ID list of 0, which may be interpreted as: write changes to the system environment because this rule is an exception intended to cause results of a change to a resource to affect the system.
- Propagation to children flag—if true, any object inside the container matching this resource name should have this rule applied as well.
- The rule priority
- The origin of the rule (Server, package, or client)

As noted above, resource rules 426 may include wildcards. Wildcards that are used in a path may be applicable on a branch-by-branch basis. For example, "C:\Documents and Settings\*\My Documents" may be interpreted as matching "C:\Documents and Settings\john\My Documents", but not matching "C:\Documents and Settings\john\Backup\My Documents".

For example, Table 3 illustrates a set of resource rules 426.

TABLE 3

Resource Rules Examples:

| Resource Path | Resource Name | Base Env. | Env. List | Propagate to children | Priority | Origin |
|---|---|---|---|---|---|---|
| $userprofiledir$\My Documents | * | −1 | 0 | True | High | Server |
| * | *.doc | −1 | 0 | True | High | Package |
| $systemdir$ | * | −2 | −2, 0 | False | Medium | Client |

The first rule in Table 3 states that whenever an application attempts to write to the user's Documents and Settings\*\My Documents folder or sub-folders, the write should not be directed to the virtualized environment, but to the system environment. If the application's files are written to the virtualized environment, they may be lost when the virtualized environment is torn down (i.e., removed). Consequently, in order to preserve these files for future use after the virtualized environment is torn down, they may be written to the system environment. The second rule states that a write to a file ending in .doc on any path should not be directed to the virtualized environment, but to the system environment. Note that the value of the propagate-to-children flag is set to true so that any path will match for the document. The third rule states that any request to read a file from C:\windows\system32 should first attempt to be satisfied from within the base environment, and if it can't be satisfied from the base environment, then attempt to satisfy the request from the system environment. This rule may be used for a process that is not otherwise allowed access outside the base environment to allow it to access specific resources needed for proper operation from the system environment. Note that access to subfolders may be restricted to the base environment again since the value of the propagate-to-children flag is set to false.

Although FIG. 4 shows rules editor 410 as the source of environment rules 422, process rules 424, and resource rules 426, as noted in Table 3, rules may originate from different sources. Rules editor 410 may be seen as an abstract representation of any of these sources. For example, in one embodiment, rules editor 410 may provide one or more tools through which an administrator or other user may input rules on the local client machine. In this embodiment, rules editor 410 may include various command line entry tools or graphical user interfaces (GUIs, not shown) through which rules may be directly entered. Tools through which rules may be entered may include various rule validation features, such as determining that a proposed new rule conflicts with existing rules. Rule entry tools may offer an opportunity for a user to resolve such conflicts or be configured to follow a default behavior such as rejecting new conflicting rules. In one embodiment, rule validation may be configured to automatically merge rules to avoid direct conflicts, such as by replacing wild cards with explicit values. In addition, rules may be merged in order to form a more concise set of rules which is logically equivalent to the non-merged rules. Numerous such alternatives are possible and are contemplated. In an alternative embodiment, rule entry tools may be provided on a server system for later delivery to client systems. In this embodiment, rule entry tools may have any of the features described above for client-side tools. In another alternative embodiment, whether used on the client or on a server, rule entry tools may provide an abstracted view of the virtualized environment to the tool user. For example, a user may be given an opportunity to specify a policy for sharing processes among virtualized environments, e.g., that two environments shall share their processes without having to specify the actual rules that are needed to implement such a policy. Rules editor 410 may receive such a policy and convert it into a set of corresponding rules.

Figure 5:
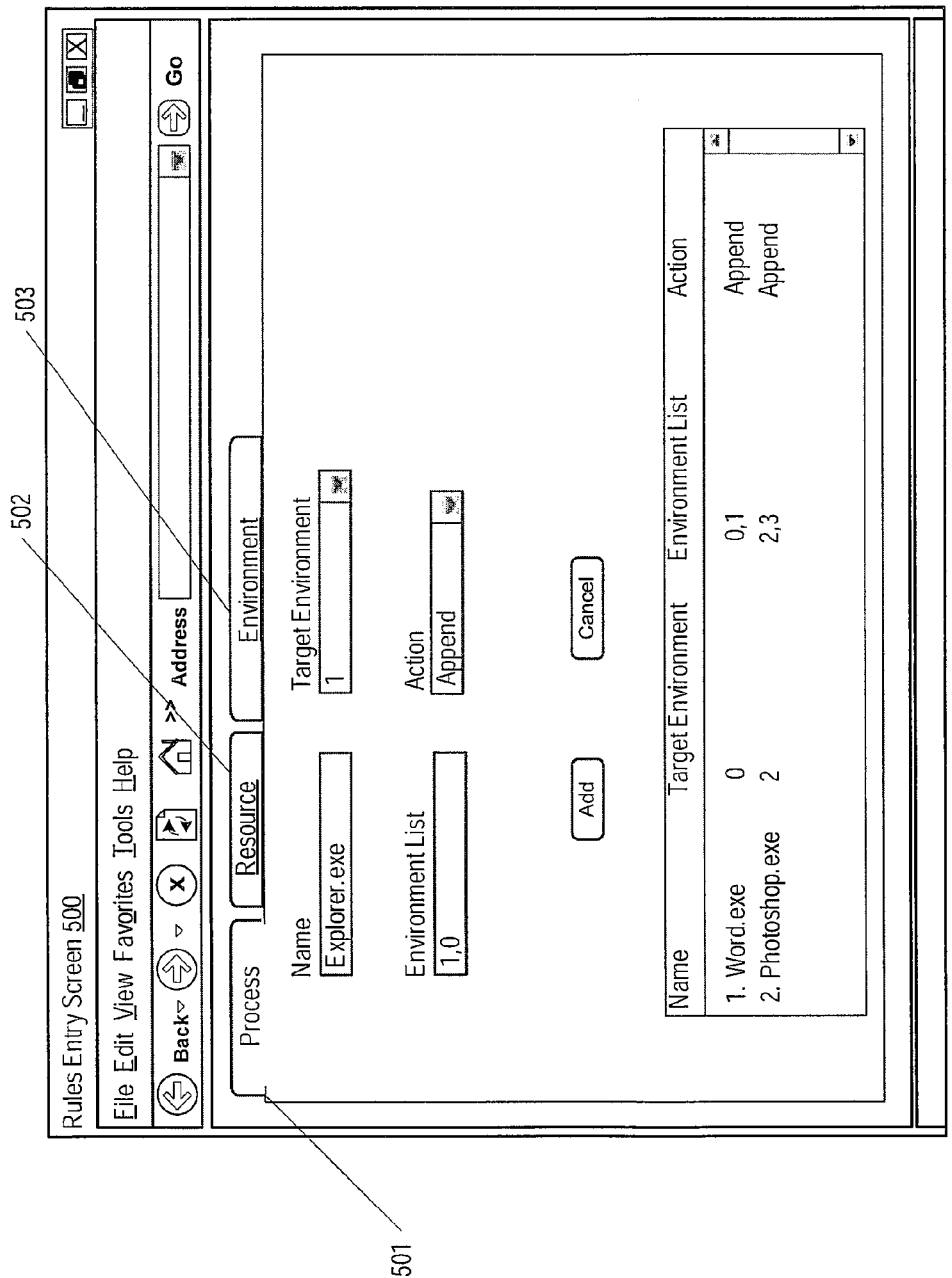
FIG. 5 illustrates one embodiment of a sample graphical user interface (GUI) that may be used to enter rules.

FIG. 5 illustrates one embodiment of a sample graphical user interface (GUI) 500 that may be used to enter rules. The illustrated interface 500 may be made available to a user on a client or on a server. Interface 500 may include features such as drop-down menus, a navigation bar, an address field, and so on. As shown, interface 500 includes a "Process" pane 501, an "Environment" pane 502, and a "Resource" pane 503. Within Process pane 501, a set of entry fields, a list of process rules, an Add button and a Cancel button are shown. A Name entry field is provided for entering the name of a resource to which a rule applies. A Target Environment pull-down list field is provided for entering the ID of a target environment to which a rule applies. An Environment List entry field is provided for entering an ordered list of environment ID's to which a rule applies. An Action pull-down list field is provided for entering the name of an action to be performed when a rule is applied. Entries and selections made from the illustrated fields may be added to a rule via an Add button. Process pane 501 also includes a Cancel button that may be used to clear entries in the Name entry, Target environment, Environment List, and Action fields. Similar entry fields may be providing on "Environment" pane 502, and "Resource" pane 503. It is noted that the fields and entry features depicted in FIG. 5 are provided for ease of discussion. In other embodiments, a wide variety of other GUI elements may be provided as desired.

In addition to entering rules from a server or client interface, rules may be created through one of the above tools or any other input mechanism and included in a package for delivery to a client. Rules included in virtualized packages may be applied to the system when the package is used. More particularly, a package may contain environment rules, process rules, and/or resource rules that may be applied to the system or virtualized environment into which the package is installed. For example, a virtualized package for installing an application into a Windows system wherein the application doesn't support Windows' concept of user's Documents and Settings areas may define a resource rule that makes $windrive$\My Documents always use the system environment. In another example, the Visio virtualized package may specify that *\Word.exe, *\Excel.exe, *\Powerpnt.exe, etc. (application included in Microsoft's Office Suite) are allowed access into any virtualized environment that the Visio virtualized package is installed into, while isolating Visio from other applications and the rest of the system.

It is noted that some rules may not be suitable to be included in a virtualized package. For example, a user may choose to save all documents in C:\share\public rather than Documents and Settings, and want to mark that folder as system environment only (no virtualization or redirection). Also, the user may want to define the order of virtualized environments to search for resources. These types of actions may not be encapsulated in a rule to be placed in a package, because the rule pre-supposes knowledge of the end-user behavior or client environment.

In a virtualized system, any rules that have been created may be converted to one or more entries in rules tables 440 and 450 by rules engine 430. Rules engine 430 may be responsible for generating the results of the rules defined by a user (or by a package, or by default) that lead to a desired virtualization of products. In one embodiment, the end result of conversion of rules by rules engine 430 may be a database or table(s) (e.g., tables 440 and 450) that can be quickly accessed to determine an action to take for any resource access request.

Process rules table 440 matches processes (or, in some embodiments, threads) to environments that they may access. Each entry in process rules table 440 applies to a particular process and is a combination of one or more environment rules 422 and process rules 424. In one embodiment, the entries included in process rules table 440 may apply to any of virtualizers 226. In particular, a rule that applies to a given process may be consistently applied to all of virtualizers 226. In one embodiment, process rules table 440 may be formatted as shown in Table 4 below. An entry in process rules table 440 may direct a virtualizer 226 to an ordered list of virtualized environments to access.

TABLE 4

Process rules table 440 example.

| Process ID | Process Name | Thread ID | Rule ID | Process Base Environment | List of Environments |
|---|---|---|---|---|---|
| 1000 | Word.exe | * | 1 | 0 | 0, 1, 2 |
| 1400 | Visio.exe | * | 8 | 1 | 1, 0 |
| 1800 | MSProject.exe | * | 25 | 2 | 2, 0, 1 |
| 240 | svchost.exe (RPCSS) | 1000 | 1 | 0 | 0, 1, 2 |
| 240 | svchost.exe | 1400 | 8 | 1 | 1, 0 |
| 240 | svchost.exe | 1800 | 25 | 2 | 2, 0, 1 |
| 2300 | FrontPg.exe | * | 37 | 3 | 3 |

In this example, it is assumed that the Microsoft® Office suite of software products is conventionally installed in the system environment ("0"), and Microsoft's Visio, Project, and FrontPage applications are each installed in separate virtualized environments 1, 2, and 3, respectively. Visio and Project are being shared with the system (conventionally installed products may interact with these virtualized applications) as shown by their respective list of environments including environment "0". While Project may access its own environment ("2"), the system environment ("0"), and Visio's environment ("1"), Visio may only access its own environment ("1") and the system environment ("0"). Consequently, data associated with Project that Project stores in its base environment is isolated from Visio. FrontPage is completely isolated and cannot even access the system environment to interact with other conventionally installed products.

In addition to the virtualization functionality provided by process rules table 440, features that apply to specific resources may be provided by resource rules tables 450. Entries in resource rules tables 450 may be seen as exceptions to the entries in process rules table 440. In one embodiment, a separate resource rules table 450 may be created for each virtualizer 226. Having separate tables for each virtualizer 226 and corresponding resource type may lead to faster table search, as there are fewer entries per table. In one embodiment, a resource rules table 450 may be formatted as shown in Table 5 below. In one embodiment, each entry in a resource rules table 450 corresponds to a respective one of resource rules 426. In this embodiment, generating resource rules tables 450 may be accomplished by sorting resource rules 426 into like resource types.

TABLE 5

Resource rules table 450 example.

| Resource Path | Resource Name | Action | Propagate to children |
|---|---|---|---|
| C:\Documents and Settings\*\My Documents | * | Use system environment | True |
| C:\Windows\system32 | * | Use virtualized environment, then system, then continue to process table | False |
| * | *.vsd | Use system environment | True |
| * | *.tmp | Use virtualized environment only | True |

Generally speaking, if a user were to create a document in a virtualized application, the default action would be to write the document into a "C:\Documents and Settings\{user}\My Documents" directory in a corresponding virtualized environment. However, documents that are saved within a particular virtualized environment may be lost or discarded when the particular virtualized environment is destroyed. One way to avoid losing the document may be to use visibility rules to store the document in the system environment, as is specified by the first entry in Table 5. This entry specifies that any access request for the particular resource "C:\Documents and Settings\{user}\My Documents" directory, by any process, be directed to the system environment so that a document created in this directory may be accessed after the virtualized environment is destroyed.

In one embodiment, during creation of process rules table 440 and resource rules tables 450, rules engine 430 may keep track of which virtualized packages have been placed in which virtualized environments. Virtualized packages may contain rules or preferences as to how the package should behave on the system (isolated, shared but in it's own environment, system install (install to environment 0), shared only with packages from a specific set, etc.). When a virtualized package is delivered from a server and installed in one or more virtualized environments, environment rules 422, process rules 424, and resource rules 426 may be updated. Rules engine 430 may be notified for every process creation in order to run through the rules to generate a list of environments for the process's accesses. The rules can be setup so that a virtualized product can be fully isolated, fully shared across the system, or visible to only certain other virtualized environments, and possibly only to certain applications. When a rule is added, the new rule may be processed for all running processes and the corresponding tables 440 and 450 updated accordingly by rules engine 430. When a rule is removed, rules engine 430 may process tables 440 and 450 to remove the effects of the rule. In one embodiment, processing a resource name may include the use of variable substitution (i.e. $userdocuments$ instead of C:\Documents and Settings\{user}, or $systemdir$ instead of C:\Windows\system32). The variable substitution may be performed by rules engine 430 before adding the resource name into a resource rules table 450. In one embodiment, rules engine 430 may set a priority for the table access, to be obeyed by the virtualizers 226 when they need to lookup a process resource request.

Figure 6:
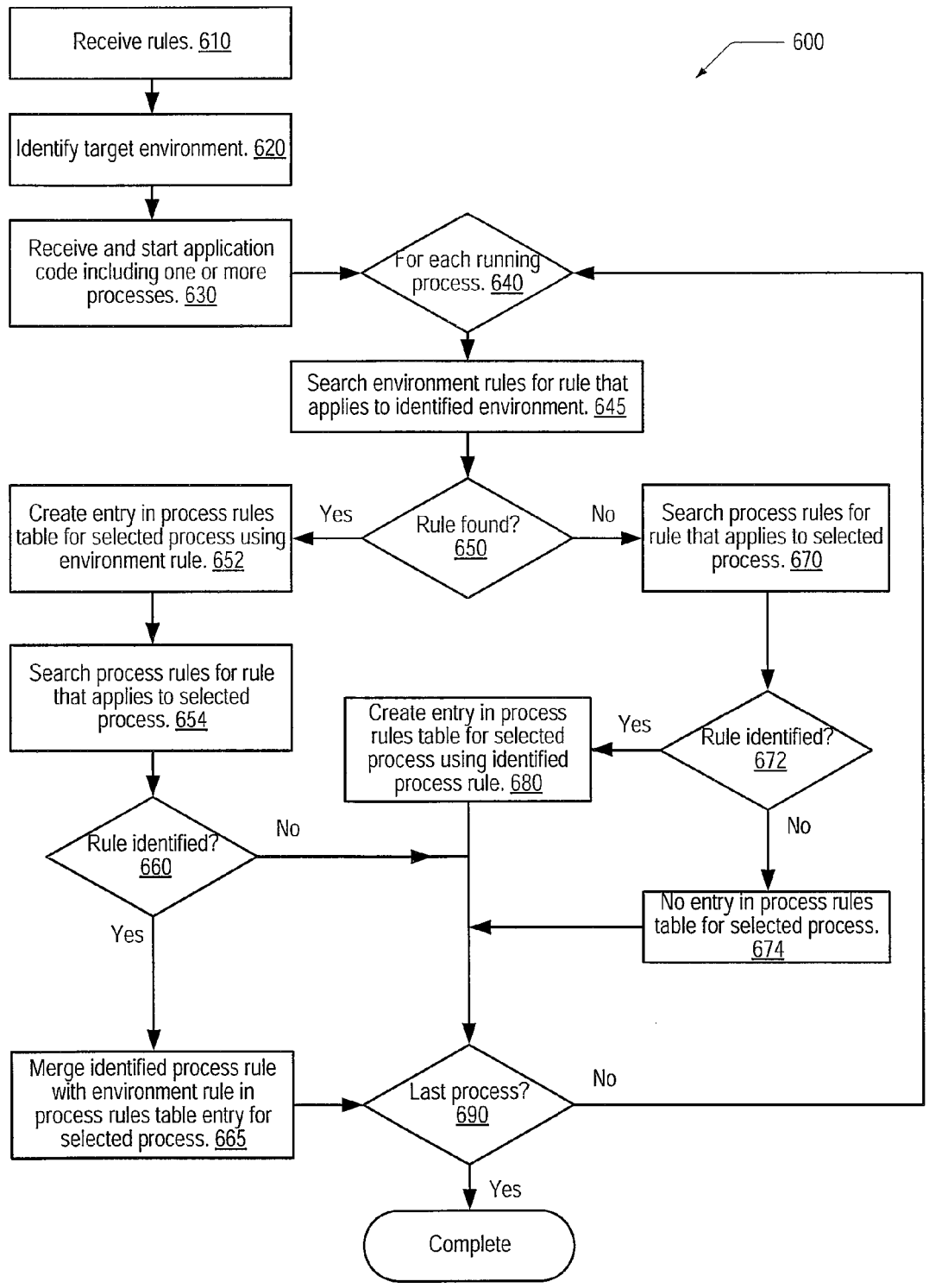
FIG. 6 illustrates one embodiment of a process that may be used to create process rules table entries for a selected virtualized environment in a virtualized system.

FIG. 6 illustrates one embodiment of a process 600 that may be used to create process rules table entries for a selected virtualized environment in a virtualized system. In the illustrated embodiment, process 600 may begin with receiving a set of rules (block 610), such as from a client, from a server, or in a virtualized package. An environment may be identified in which to apply the received rules (block 620). For the identified environment, application code including one or more processes may be started (block 630). Only running processes are considered because in this embodiment, process rules table entries only apply to running processes. For each running process (decision block 640), the received set of rules may be searched for an environment rule that applies to the identified environment (block 645). If an applicable environment rule is found (decision block 650), an entry may be created in a process rules table for a selected running process using the applicable environment rule (block 652). The received set of rules may also be searched for a process rule that applies to the selected running process (block 654). If a process rule is identified that applies to the selected running process (decision block 660), the process rule may be merged with the previously created entry (block 665). Upon completion of the merge (or if a process rule is not identified that applies to the selected running process), if the selected running process is the last running process in the selected virtual environment (decision block 690), process 600 is complete. If the selected running process is not the last running process in the selected virtual environment (decision block 690), a next running process may be selected and process 600 may continue at decision block 640.

If an applicable environment rule is not found (decision block 650), the received set of rules may also be searched for a process rule that applies to the selected running process (block 670). If a process rule is identified that applies to the selected running process (decision block 672), an entry may be created in a process rules table for a selected running process using the identified process rule (block 680). If a process rule is not identified that applies to the selected running process (decision block 672), no entry is made in the process rules table for the selected process. Upon completion of the entry creation, or if a process rule is not identified that applies to the selected running process, if the selected running process is the last running process in the selected virtual environment (decision block 690), process 600 may continue at decision block 690. It is noted that process 600 may be repeated for each environment in a virtualized system.

Figure 7:
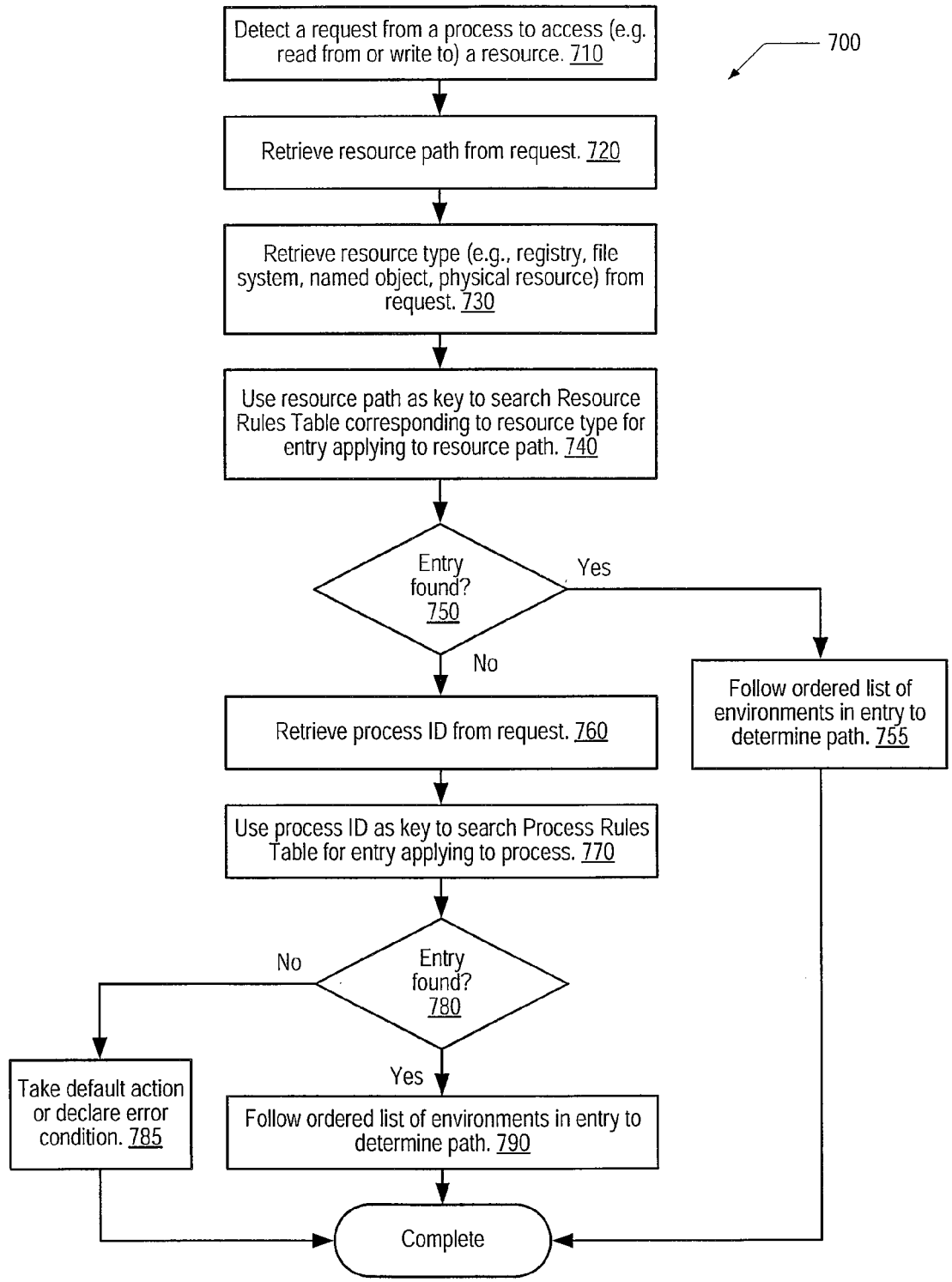
FIG. 7 illustrates one embodiment of a process that may be used to process a request to access a resource based on a set of visibility rules.

FIG. 7 illustrates one embodiment of a process 700 that may be used to process a request to access a resource based on a set of visibility rules. Process 700 may begin with detection of a request from a process to access a resource (e.g., to read from or write to a file or registry value, etc.) (block 710). A resource path (e.g., a data path indicating a location in a hierarchical directory tree) corresponding to the request may be retrieved (block 720). A resource type (e.g., registry, file system, named object, or physical resource) corresponding to the request may also be retrieved (block 730). The retrieved resource path may be used (e.g., as a key) to search a resource rules table that corresponds to the retrieved resource type for an entry that applies to the resource path (block 740). If an entry is found (decision block 750), an ordered list of environments retrieved from the entry that is found may be followed to determine the path that is to be used to satisfy the access request (block 755), completing process 700. If an entry is not found (decision block 750), a process ID may be retrieved from the request (block 760) and used as a key to search a process rules table for an entry that applies to the retrieved process ID (block 770). If an entry is found (decision block 780), an ordered list of environments retrieved from the entry that is found may be followed to determine the path that is to be used to satisfy the access request (block 790), completing process 700. If an entry is not found (decision block 780), an error condition may be declared and/or other appropriate action taken, such as taking a default action to satisfy the request (block 785), completing process 700.

Figure 8:
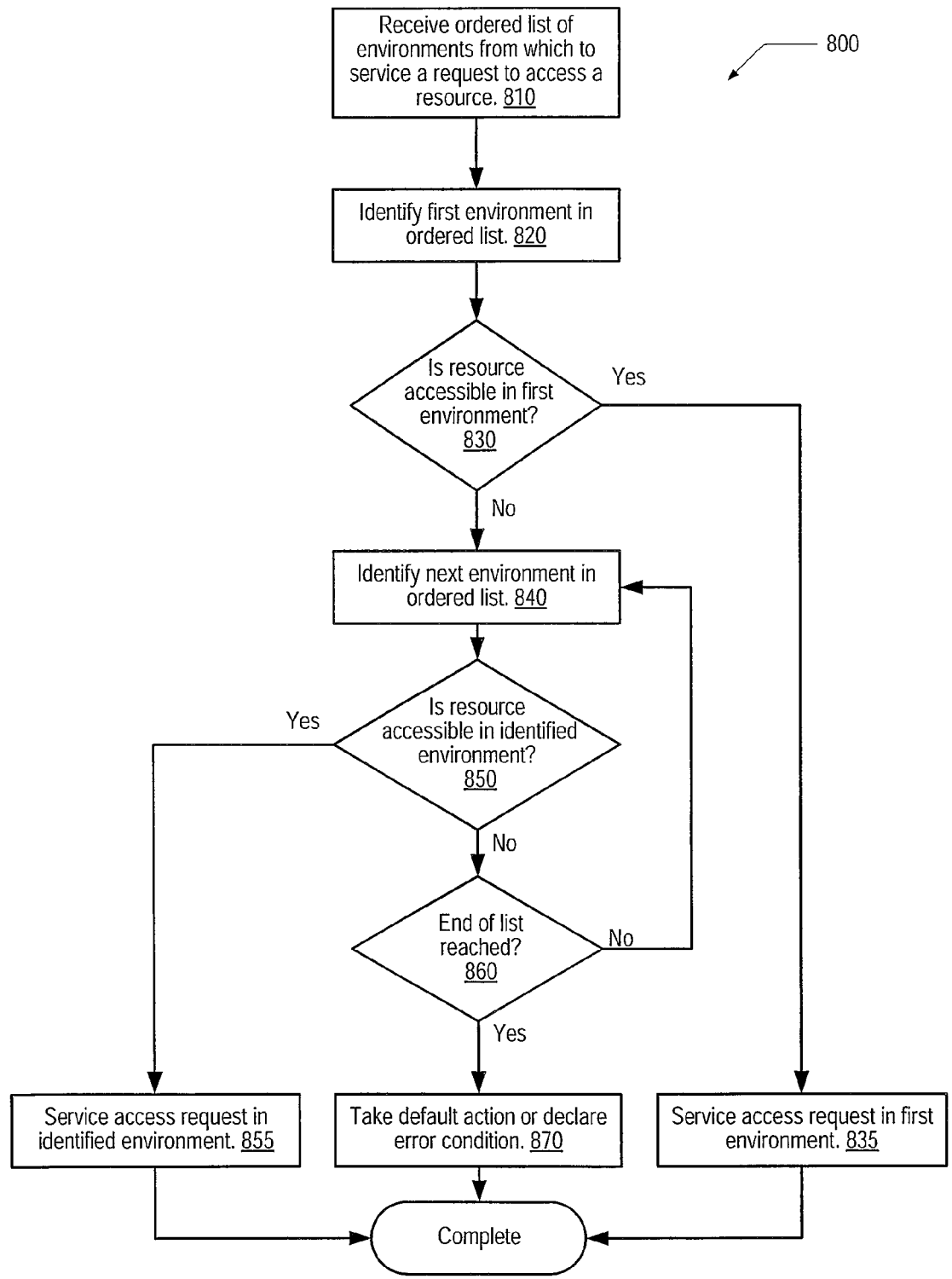
FIG. 8 illustrates one embodiment of a process that may be used to access a resource based on an ordered list of environments.

FIG. 8 illustrates one embodiment of a process 800 that may be used to access a resource based on an ordered list of environments. Process 800 may begin with receiving an ordered list of environments from which to service a request to access a particular resource (block 810), such as may be retrieved from a resource rules table entry or a process rules table entry. A first environment in the ordered list may be identified (block 820). If the particular resource is accessible in the identified first environment (decision block 830), the access request may be serviced in the first environment (block 835, completing process 800. If the particular resource is not accessible in the identified first environment (decision block 830), a next environment may be identified from the ordered list (block 840). If the particular resource is accessible in the identified next environment (decision block 850), the access request may be serviced in the identified next environment (block 855, completing process 800. If the particular resource is not accessible in the identified next environment (decision block 850), and if the end of the ordered list has not been reached (decision block 860), process 800 may continue at block 840 where a next environment may be identified. If the particular resource is not accessible in the identified next environment (decision block 850), and if the end of the ordered list has been reached (decision block 860), an error condition may be declared or a default action may be taken (block 870, completing process 800.

Figure 9:
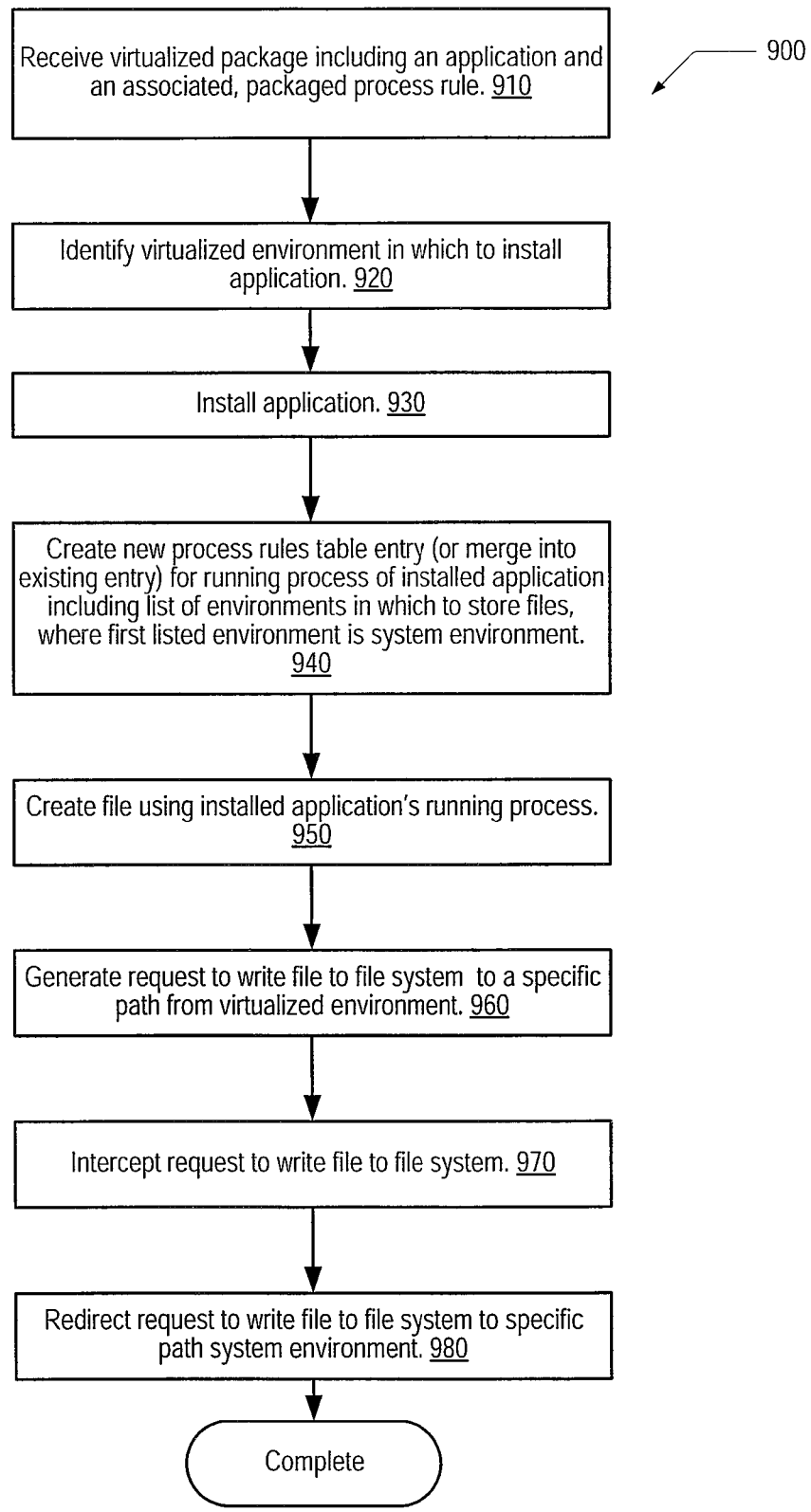
FIG. 9 illustrates one embodiment of a process that may be used to save a document created by a virtualized application.

FIG. 9 illustrates one embodiment of a process 900 that may be used to save a document created by a virtualized application. Process 900 may begin with reception of a virtualized package including an application and an associated, packaged process rule (block 910). In response to receiving the package, a virtualized environment may be identified in which to install the package (block 920) and the package may be installed (block 930). Once the package and the included application has been installed, an entry in a process rules table may be created that corresponds to a running process launched by the application (block 940). The entry may include a list of environments in which to store files created by the installed application. The first environment on the list may be the system environment. If an entry already exists in the process rules table that corresponds to the process, the packaged process rule may be merged with or used to replace the existing entry. The installed application's running process may create a file (block 950) and generate a request to write the file to a specific path in a file system from the virtualized environment (block 960). The request may be intercepted (block 970) and redirected to write the file to the specific path in the file system of the system environment (block 980), completing process 900.

It is noted that the foregoing flow charts are for purposes of discussion only. In alternative embodiments, the elements depicted in the flow chart may occur in a different order, or in some cases concurrently. Additionally, some of the flow chart elements may not be present in various embodiments, or may be combined with other elements. All such alternatives are contemplated.

It is noted that various embodiments may further include receiving, sending, or storing instructions and/or data implemented in accordance with the foregoing description upon a computer-accessible storage medium. Generally speaking, a computer-accessible storage medium may include any storage media accessible by one or more computers (or processors) during use to provide instructions and/or data to the computer(s). For example, a computer-accessible storage medium may include storage media such as magnetic or optical media, e.g., one or more disks (fixed or removable), tape, CD-ROM, DVD-ROM, CD-R, CD-RW, DVD-R, DVD-RW, etc. Storage media may further include volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. In some embodiments the computer(s) may access the storage media via a communication means such as a network and/or a wireless link.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated. It is intended that the following claims be interpreted to embrace all such variations and modifications.

What is claimed is:

1. A computer system comprising:
   a memory storing program instructions; and
   a processor configured to execute said program instructions;
   wherein the program instructions are executable by the processor to:
   generate an interface usable to configure visibility rules for a plurality of environments including one or more virtualized environments and a system environment, the system environment being a non-virtualized environment;
   receive input from a user identifying a process, a target environment for the process, and an action that may be performed by the process, wherein the action comprises an action taken from the group comprising: communicating with a second process; writing a value to a registry; reading a value from a registry; writing a file to a file system; reading a file from a file system; accessing a physical resource; and accessing a named object;
   store data in a rules database corresponding to the received input, said data corresponding to a first rule;
   wherein said first rule is usable to:
   identify a target environment of the plurality of environments in which to process a request by said process to perform said action, wherein the target environment is different from a base environment in which the process is executing; and
   direct the request to the target environment.

2. The system of claim 1, further comprising a rules engine configured to:
   convert a first database of rules to a second database of rules, the second database of rules comprising:
   a first rules table in which rules correspond to processes; and
   a second rules table in which rules correspond to resources; and wherein said first rule is retrieved from the second database of rules.

3. The system of claim 2, wherein said first rule corresponds to both a rule from the first database that applies to a particular environment and a rule from the first database that applies to a particular virtualized resource.

4. The system of claim 1, wherein the target environment is a non-virtualized environment and the resource is accessible as a non-virtualized resource in the target environment.

5. The system of claim 1,
wherein said first rule also identifies an alternative environment in which to process the request.

6. The system of claim 1, wherein the first database of rules and an application that corresponds to the first process are received by a host computer system in an install package and the application is installed in the base environment.

7. A non-transitory computer readable storage medium comprising program instructions, wherein said program instructions are executable to:
generate an interface usable to configure visibility rules for a plurality of environments including one or more virtualized environments and a system environment, the system environment being a non-virtualized environment;
receive input from a user identifying a process, a target environment for the process, and an action that may be performed by the process, wherein the action comprises an action taken from the group comprising: communicating with a second process; writing a value to a registry; reading a value from a registry; writing a file to a file system; reading a file from a file system; accessing a physical resource; and accessing a named object;
store data in a rules database corresponding to the received input, said data corresponding to a first rule;
wherein said first rule is usable to:
identify a target environment of the plurality of environments in which to process a request by said process to perform said action, wherein the target environment is different from a base environment in which the process is executing; and
direct the request to the target environment.

8. The non-transitory computer readable storage medium of claim 7, further comprising a rules engine configured to:
convert a first database of rules to a second database of rules, the second database of rules comprising:
a first rules table in which rules correspond to processes; and
a second rules table in which rules correspond to resources; and
wherein said first rule is retrieved from the second database of rules.

9. The non-transitory computer readable storage medium of claim 8, wherein said first rule corresponds to both a rule from the first database that applies to a particular environment and a rule from the first database that applies to a particular virtualized resource.

10. The non-transitory computer readable storage medium of claim 7, wherein the target environment is a non-virtualized environment and the resource is accessible as a non-virtualized resource in the target environment.

11. The non-transitory computer readable storage medium of claim 7,
wherein said first rule also identifies an alternative environment in which to process the request.

12. The non-transitory computer readable storage medium of claim 7, wherein the first database of rules and an application that corresponds to the first process are received by a host computer system in an install package and the application is installed in the base environment.

13. A method for use in a computing system, the method comprising:
generating an interface usable to configure visibility rules for a plurality of environments including one or more virtualized environments and a system environment, the system environment being a non-virtualized environment;
receiving input from a user identifying a process, a target environment for the process, and an action that may be performed by the process, wherein the action comprises an action taken from the group comprising: communicating with a second process; writing a value to a registry; reading a value from a registry; writing a file to a file system; reading a file from a file system; accessing a physical resource; and accessing a named object;
storing data in a rules database corresponding to the received input, said data corresponding to a first rule;
wherein said first rule is usable to:
identify a target environment of the plurality of environments in which to process a request by said process to perform said action, wherein the target environment is different from a base environment in which the process is executing; and
direct the request to the target environment.

14. The method of claim 13, further comprising:
converting a first database of rules to a second database of rules, the second database of rules comprising:
a first rules table in which rules correspond to processes; and
a second rules table in which rules correspond to resources; and
wherein said first rule is retrieved from the second database of rules.

15. The method of claim 14, wherein said first rule corresponds to both a rule from the first database that applies to a particular environment and a rule from the first database that applies to a particular virtualized resource.

16. The method of claim 13, wherein the target environment is a non-virtualized environment and the resource is accessible as a non-virtualized resource in the target environment.

17. The method of claim 13, wherein said first rule also identifies an alternative environment in which to process the request.

18. The method of claim 13, wherein the first database of rules and an application that corresponds to the first process are received by a host computer system in an install package and the application is installed in the base environment.

\* \* \* \* \*